US012809364B2

(12) United States Patent
Kathari et al.

(10) Patent No.: US 12,809,364 B2
(45) Date of Patent: Nov. 24, 2026

(54) SYSTEM FOR AUTOMATED ROOT-CAUSE DIAGNOSIS OF PLANT-WIDE OSCILLATIONS AND A METHOD THEREOF

(71) Applicant: Honeywell International Inc., Charlotte, NC (US)

(72) Inventors: Sudhakar Kathari, Chikkakannalli (IN); Rajeev Naduthota, Bangalore (IN); Peter Hart, Kells Meath (IE)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 344 days.

(21) Appl. No.: 18/675,184

(22) Filed: May 28, 2024

(65) Prior Publication Data

US 2025/0284273 A1 Sep. 11, 2025

(30) Foreign Application Priority Data

Mar. 11, 2024 (IN) ............................ 202411017287

(51) Int. Cl.
*G05B 23/02* (2006.01)

(52) U.S. Cl.
CPC ..... *G05B 23/0275* (2013.01); *G05B 23/0221* (2013.01); *G05B 23/0264* (2013.01)

(58) Field of Classification Search
CPC ............ G05B 23/0221; G05B 23/0264; G05B 23/0275
See application file for complete search history.

(56) References Cited

U.S. PATENT DOCUMENTS

2007/0150079 A1* 6/2007 Blevins .............. G05B 23/0251 700/41
2008/0167842 A1* 7/2008 Cochran .............. G05B 23/024 703/2
2014/0324369 A1* 10/2014 Yang .................... G01R 31/086 702/59
2016/0098647 A1* 4/2016 Nixon ................ G05B 13/0265 700/47

OTHER PUBLICATIONS

Yuan et al. Root Cause Diagnosis of Plant-Wide Oscillations Using Granger Causality (Year: 2012).*
Saxena et al. Neurocomputing—A Review of Clustering Techniques and Developments (Year: 2016).*
Duan et al. “Methods for Root Cause Diagnosis of Plant Wide Oscillations” (Year: 2014).*
Yang et al. “Signed Directed Graph Based Modeling and it’s Validation from Process Knowledge and Process Data” (Year: 2012).*

* cited by examiner

*Primary Examiner* — Sujoy K Kundu
(74) *Attorney, Agent, or Firm* — Alston & Bird LLP

(57) ABSTRACT

The present disclosure discloses a system and a method for the root-cause diagnosis of plant-wide oscillations based on process data. According to an embodiment, the method includes automated processing of data, an automated approach for selecting relevant and clustering common control loops having oscillations. The method further includes a causality analysis-based automated approach for identifying root causes and propagation paths. The disclosed system and method improve overall process performance and production efficiency by efficiently detecting and diagnosing the root causes of the plant-wide oscillations and addressing associated issues. The system further enhances operational efficiency, mitigates safety risks, and minimizes production losses and costs.

20 Claims, 15 Drawing Sheets

400

600

800

1100

SYSTEM FOR AUTOMATED ROOT-CAUSE DIAGNOSIS OF PLANT-WIDE OSCILLATIONS AND A METHOD THEREOF

FIELD OF INVENTION

The present disclosure generally relates to a root-cause diagnosis of plant-wide oscillations in assets. More specifically, the present disclosure provides a system and a method for automated root-cause diagnosis of the plant-wide oscillations in control loops.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

In industrial processes, oscillations exhibit periodic characteristics, featuring distinct amplitudes and frequencies. The oscillations are common in industrial processes, often arising from factors such as faulty equipment, inadequate equipment sizing, improper sensor placement, suboptimal tuning of control loops, interactions between multiple control loops, inconsistent operating procedures, and external disturbances. For example, faulty equipment such as malfunctioning of sensors, actuators, or control valves can cause oscillations. According to some examples, certain process dynamics such as long dead times, integrator or runaway processes, and variations in process inputs may further cause oscillations.

When the oscillation occurs at any control loop of an asset in a plant, it can propagate to the whole plant or specific units of the plant via interconnected control loops, units, and material flow pathways. The presence of these oscillations is known as plant-wide oscillations.

The plant-wide oscillations in the industrial process can significantly impact the overall performance and efficiency of the plant in the following manner for example:

- The plant-wide oscillations can lead to unstable process conditions, resulting in equipment failures, product quality issues, and increased downtime
- The plant-wide oscillations can lead to excessive energy consumption, increased waste production, and additional maintenance and repair costs.
- The plant-wide oscillations can have detrimental effects on product quality, leading to deviations from desired specifications.
- The plant-wide oscillations can lead to erratic process behavior which may contribute to environmental concerns such as emissions, waste generation, and resource inefficiencies.

To gather, the occurrence of plant-wide oscillations can result in inconsistent product quality, reduced production efficiency, safety risks, increased energy consumption, destabilization of control loops, and production delays. Therefore, it is crucial to detect and diagnose the root causes of such oscillations and identify their propagation paths.

Thus, there is a need to provide a system and a method to mitigate the above-mentioned issues related to detecting and diagnosing the root causes of the plant-wide oscillations.

Through applied effort, ingenuity, and innovation, the inventors have solved and proposed the above problem(s) by developing the solutions embodied in the present disclosure, the details of which are described further herein.

SUMMARY OF THE INVENTION

In general, embodiments of the present disclosure herein provide a solution for automating the root-cause diagnosis of plant-wide oscillations based on operational data. Other implementations will be or will become, apparent to one with skill in the art upon examination of the following figures and detailed description. It is intended that all such additional implementations be included within this description within the scope of the disclosure.

In one embodiment, the present disclosure discloses a method for performing a root-cause diagnosis of oscillations in a plurality of assets included in an industrial process. The method includes receiving operational data from at least two or more assets among the plurality of assets, said operational data indicating one or more parameters associated with functioning of said assets. Further, the method includes processing the operational data from the at least two or more assets to perform a spectral analysis of the operational data to determine, for each asset of the plurality of assets, a set of dominant frequencies and a corresponding power. The dominant frequencies indicate anomalous vibrations occurring in each asset and the corresponding power indicates a power associated with the anomalous vibrations. Further, the method includes forming a group of assets that shares a common dominant frequency among each asset in each group of assets. Further, the method includes determining a directed connectivity and a connectivity strength between each asset in each group of assets based on a causality analysis on each group of assets. Further, the method includes comparing the connectivity strength, between each asset in each group of assets, with a predefined threshold value. Further, the method includes determining, from the group of assets, one or more root-cause assets and a root cause in the one or more root-cause assets based on the connectivity strength more than the predefined threshold value and a plurality of validation parameters.

According to some embodiment, the present disclosure discloses a system for performing a root-cause diagnosis of oscillations in a plurality of assets included in an industrial process. The system includes one or more processors, the memory, and one or more programs stored in the memory. In an embodiment, the one or more programs when executed by the one or more processors, cause the one or more processors to receive operational data from at least two or more assets among the plurality of assets, said operational data indicating one or more parameters associated with functioning of said assets. Further, the one or more processors are configured to process the operational data from the at least two or more assets to perform a spectral analysis of the operational data to determine, for each asset of the plurality of assets, a set of dominant frequencies and a corresponding power. The dominant frequencies indicate anomalous vibrations occurring in each asset and the corresponding power indicates a power associated with the anomalous vibrations. Further, the one or more processors are configured to form a group of assets that shares a common dominant frequency among each asset in each group of assets. Further, the one or more processors are configured to determine a directed connectivity and a connectivity strength between each asset in each group of assets based on a causality analysis on each group of assets.

Further, the one or more processors are configured to compare the connectivity strength, between each asset in each group of assets, with a predefined threshold value. Further, the one or more processors are configured to determine, from the group of assets, one or more root-cause assets and a root cause in the one or more root-cause assets based on the connectivity strength more than the predefined threshold value and a plurality of validation parameters.

According to some embodiment, the present disclosure discloses a non-transitory computer-readable storage medium storing program instructions for performing a root-cause diagnosis of oscillations in a plurality of assets included in an industrial process. According to an embodiment, the instructions when executed, perform the steps of receiving operational data from at least two or more assets among the plurality of assets, said operational data indicating one or more parameters associated with functioning of said assets. The non-transitory computer-readable storage medium further performs: processing the operational data from the at least two or more assets to perform a spectral analysis of the operational data to determine, for each asset of the plurality of assets, a set of dominant frequencies and a corresponding power. The dominant frequencies indicate anomalous vibrations occurring in each asset and the corresponding power indicates a power associated with the anomalous vibrations. The non-transitory computer-readable storage medium further performs: forming a group of assets that shares a common dominant frequency among each asset in each group of assets. The non-transitory computer-readable storage medium further performs: determining a directed connectivity and a connectivity strength between each asset in each group of assets based on a causality analysis on each group of assets. The non-transitory computer-readable storage medium further performs: comparing the connectivity strength, between each asset in each group of assets, with a predefined threshold value. The non-transitory computer-readable storage medium further performs: determining, from the group of assets, one or more root-cause assets and a root cause in the one or more root-cause assets based on the connectivity strength more than the predefined threshold value and a plurality of validation parameters.

The above summary is provided merely for the purpose of summarizing some exemplary embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

DESCRIPTION OF THE DRAWINGS

Figure 1:
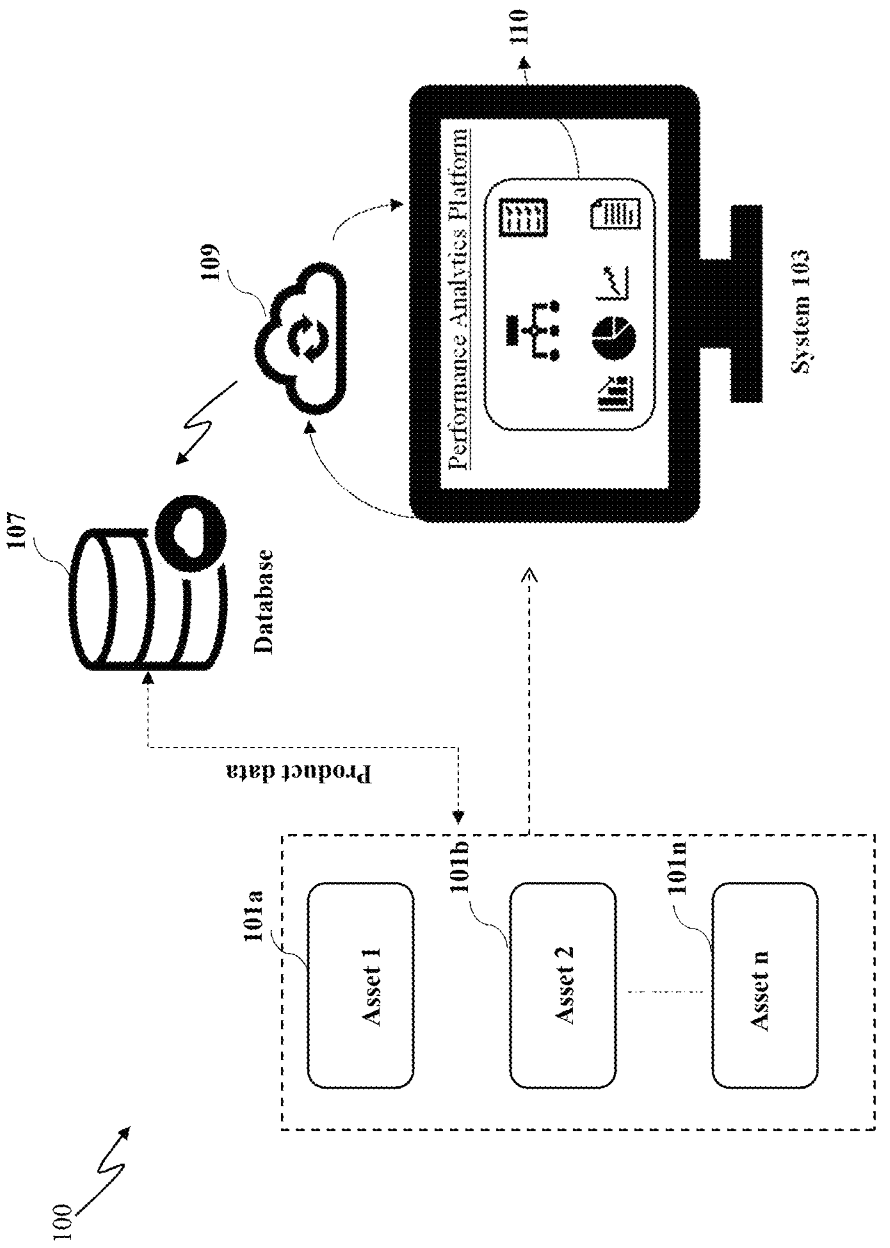
Figure 2:
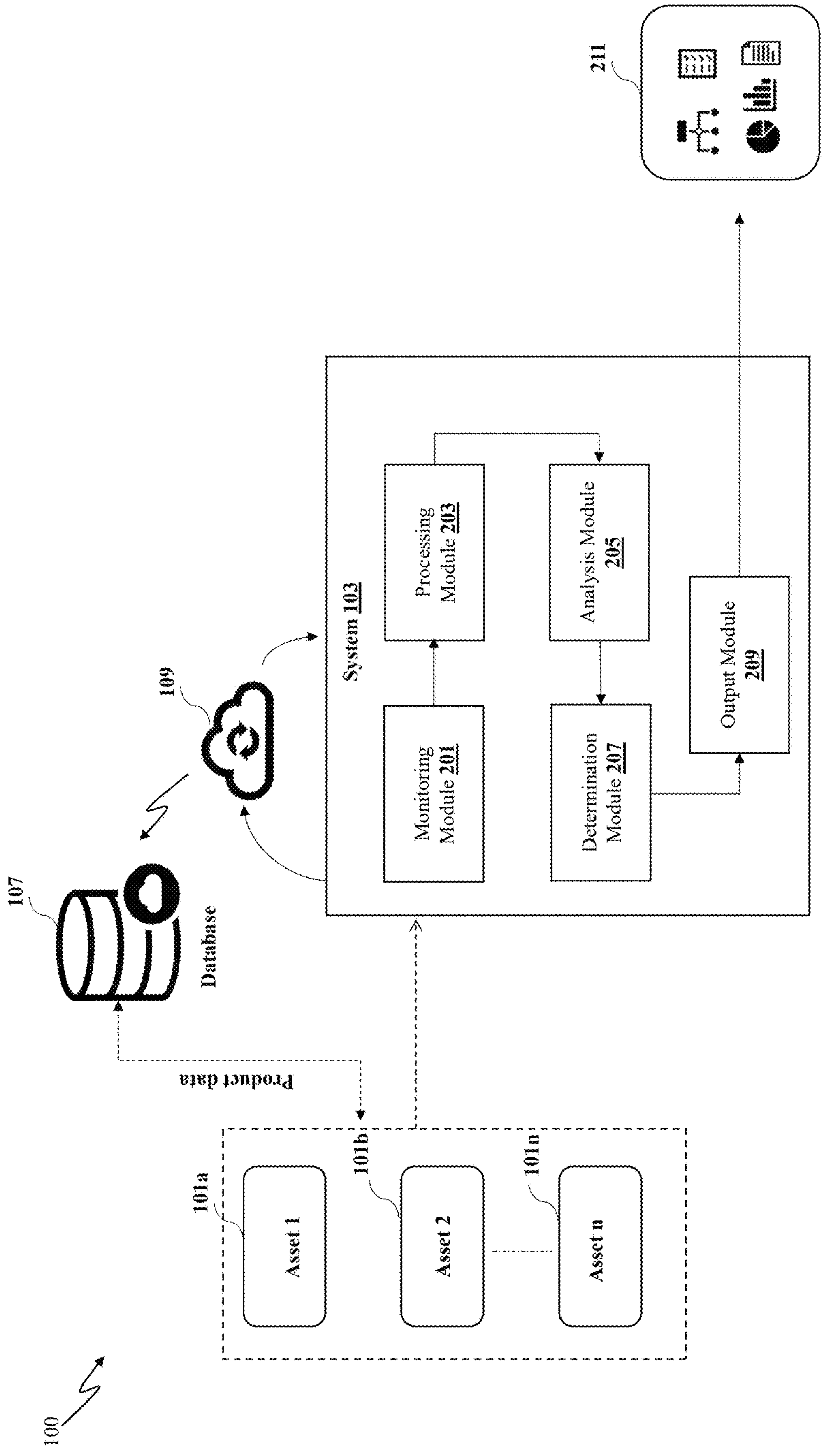
Figure 3:
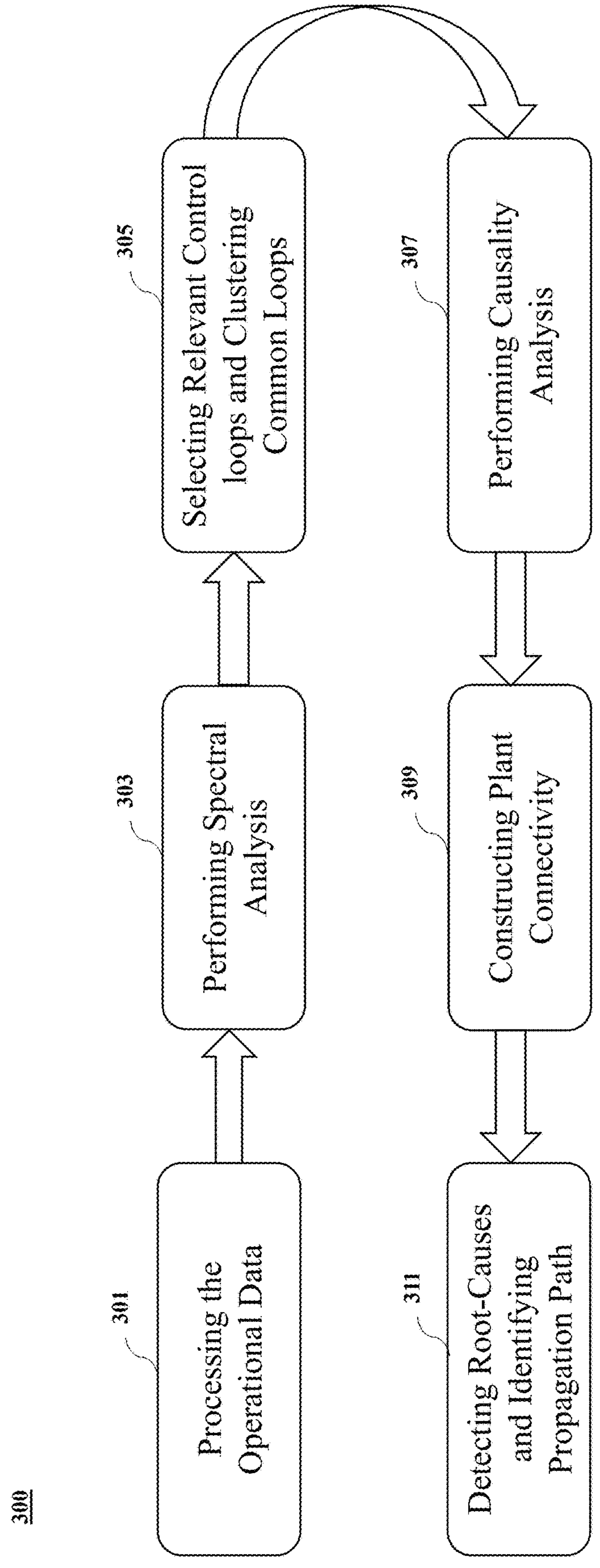

Having thus described the embodiments of the disclosure in general terms, reference now will be made to the accompanying drawings, which are not necessarily drawn to scale, and wherein:

FIG. 1 illustrates an example environment of a system for performing a root-cause diagnosis of oscillations in assets included in an industrial process, according to an embodiment of the present disclosure;

FIG. 2 illustrates an example block diagram of the system depicted in FIG. 1, in accordance with an embodiment of the present disclosure;

FIG. 3 illustrates a general operational flow 300 for performing a root-cause diagnosis of oscillations in assets included in an industrial process, according to an embodiment of the present disclosure.

Figure 4:
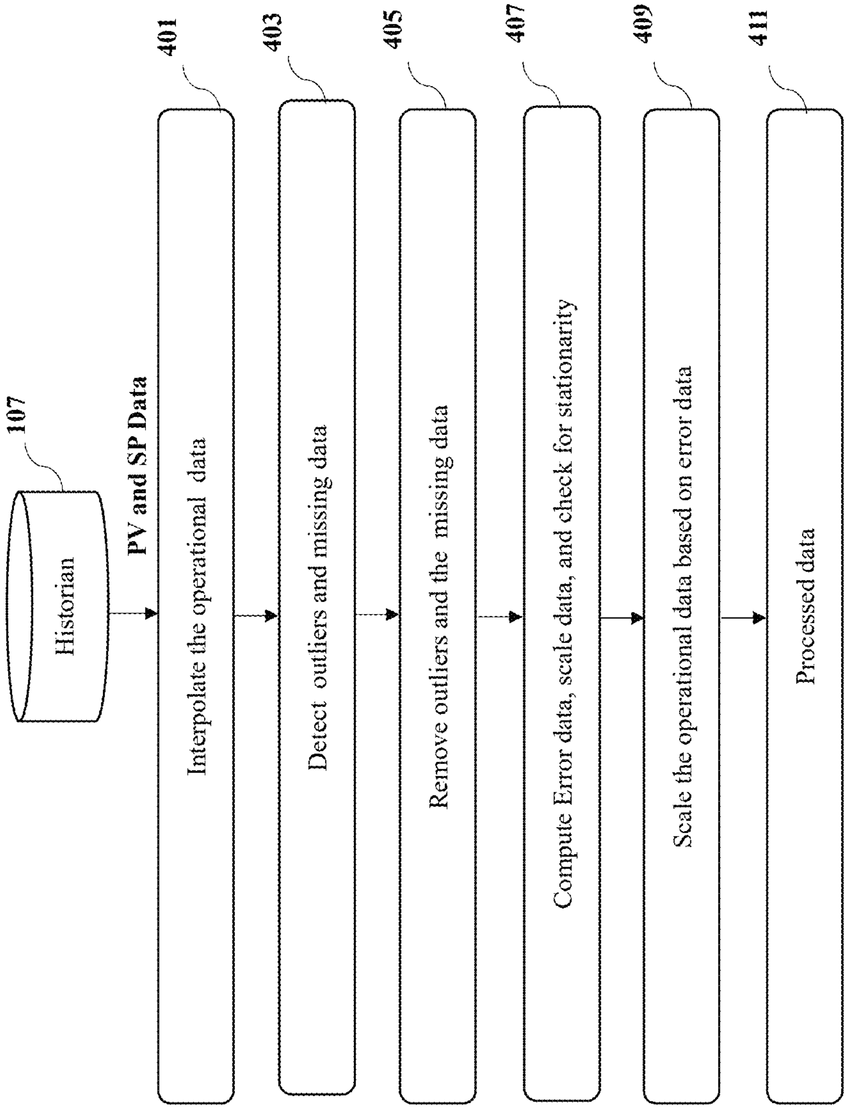
Figure 5:
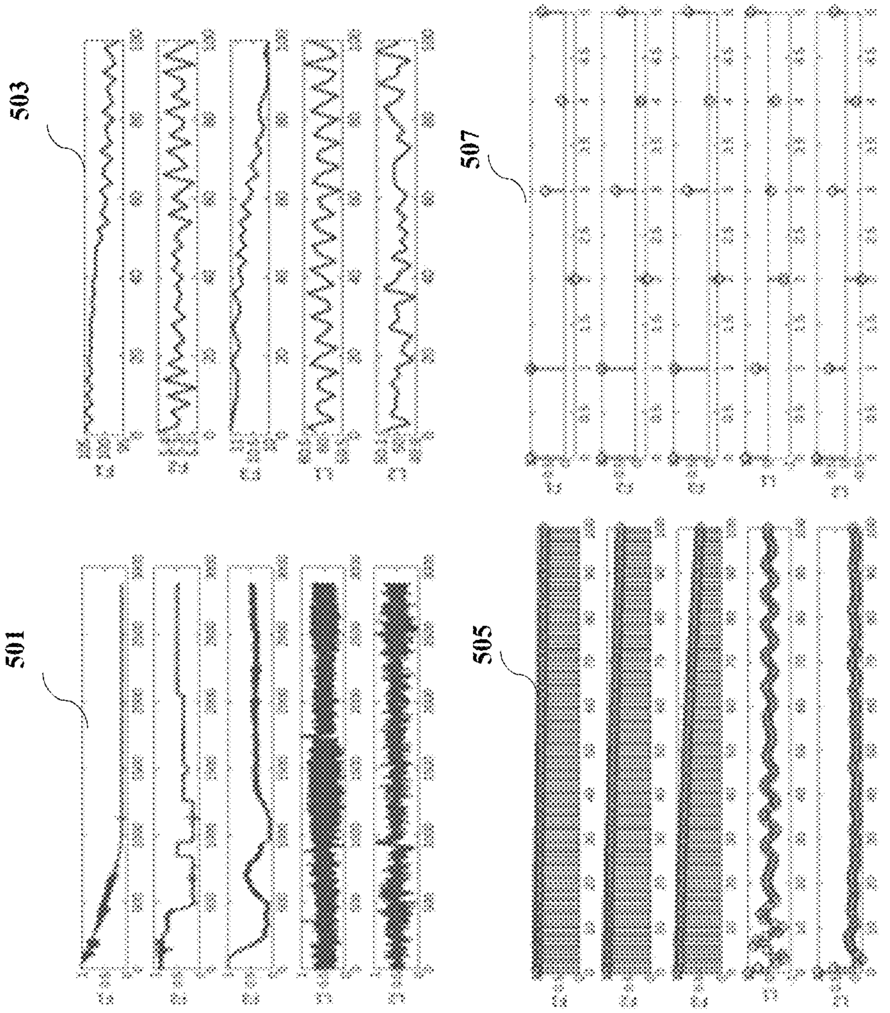
Figure 6:
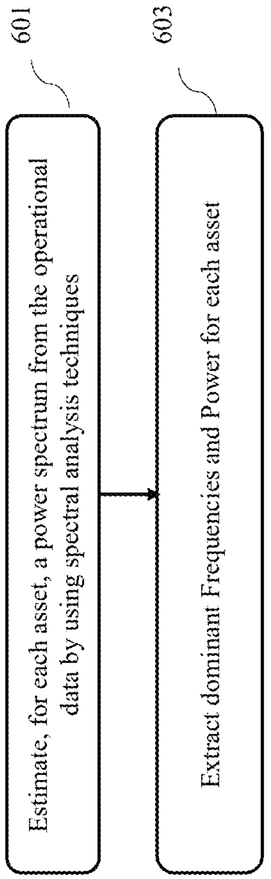
Figure 7:
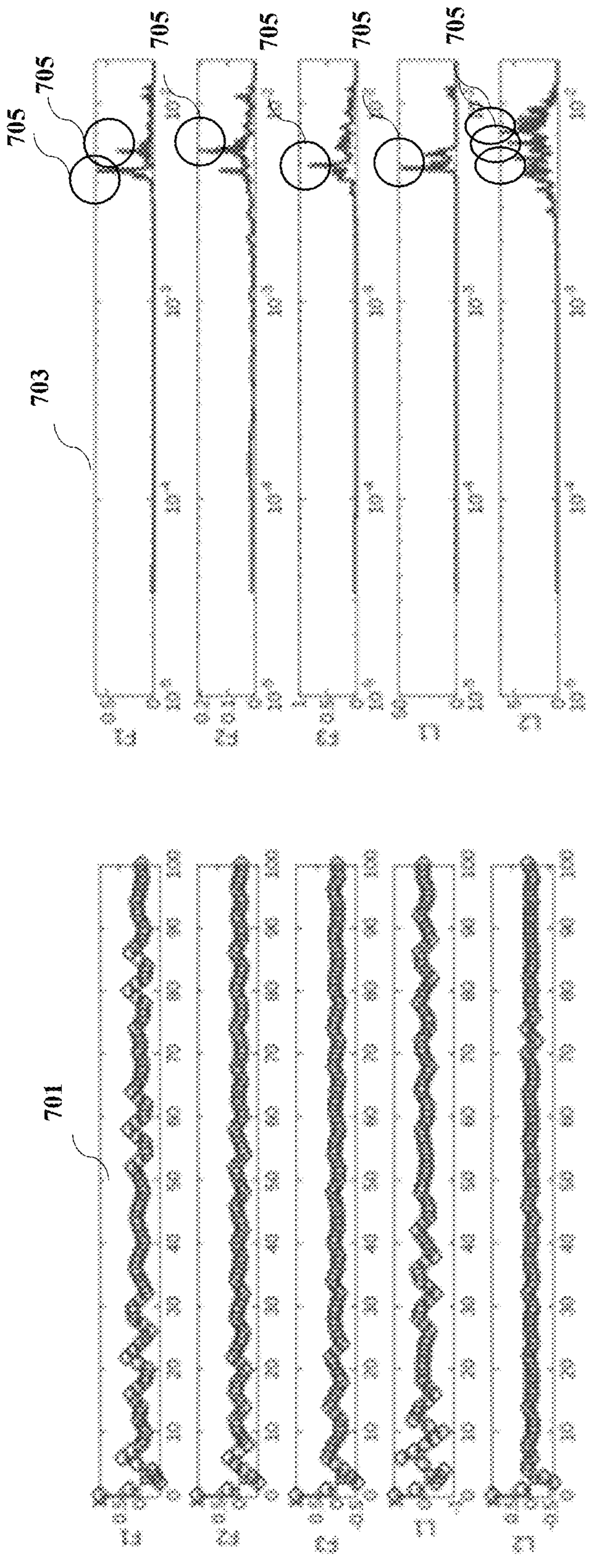
Figure 8:
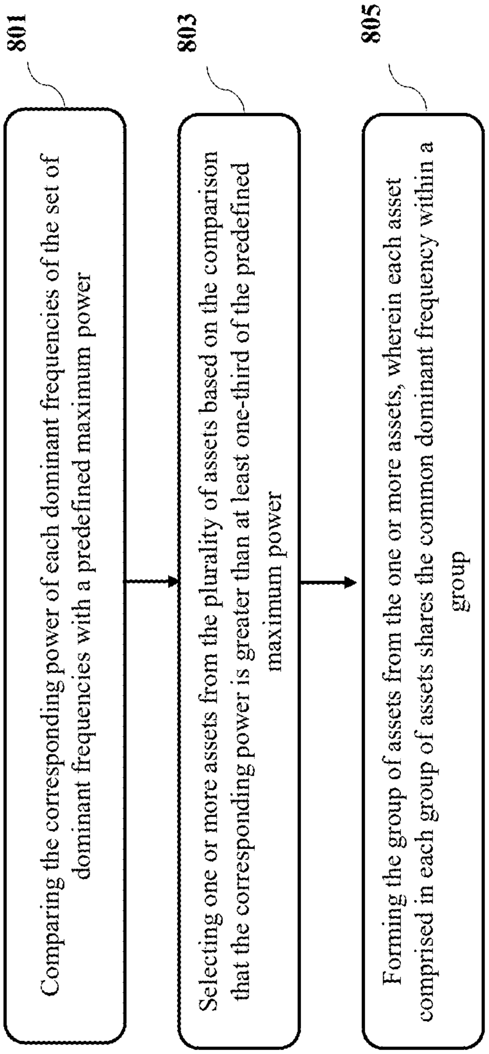
Figure 9:
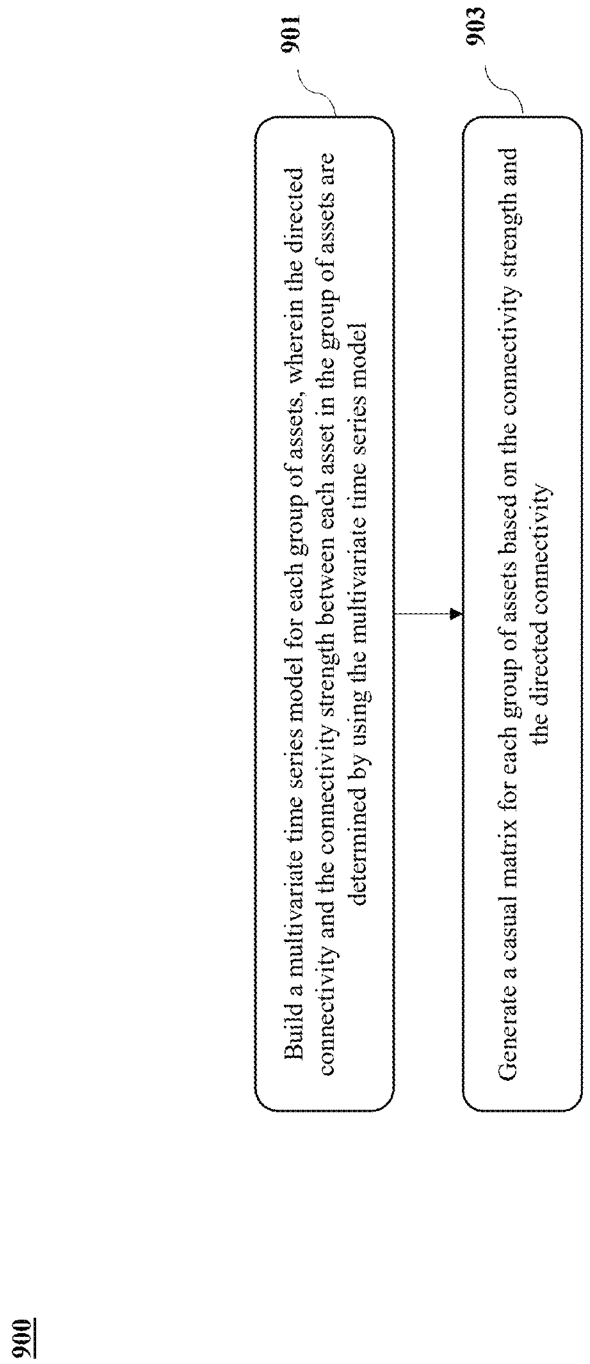
Figure 10:
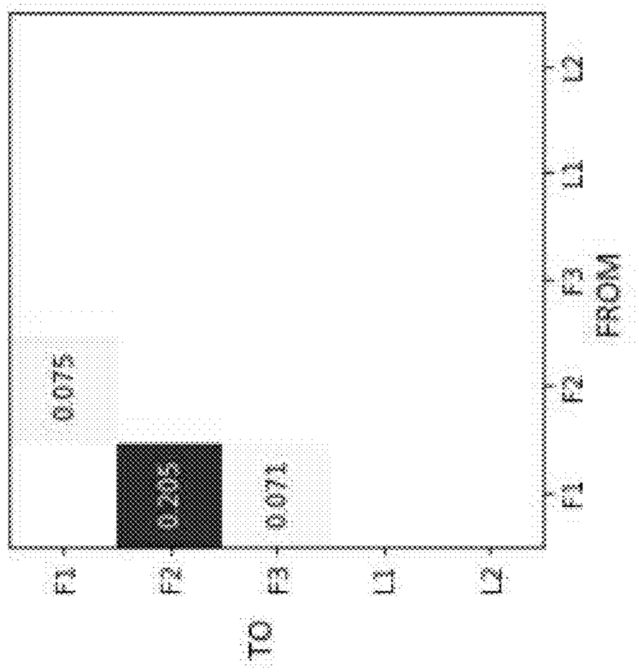
Figure 11:
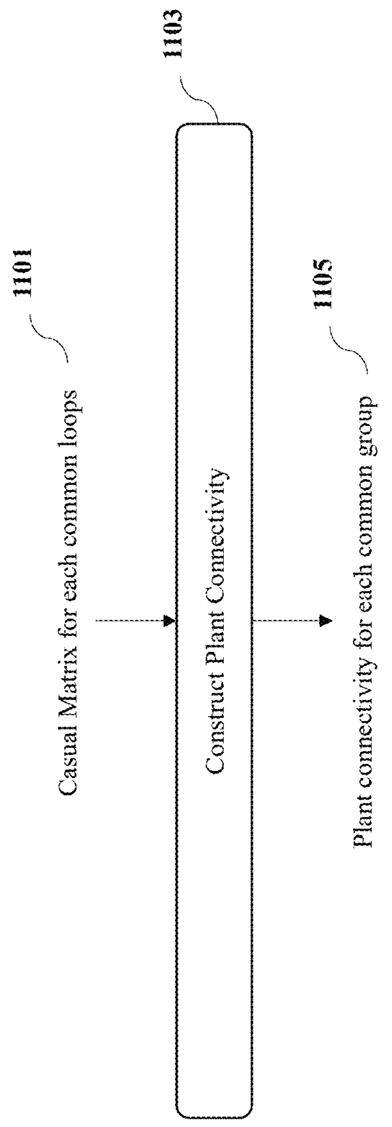
Figure 12:
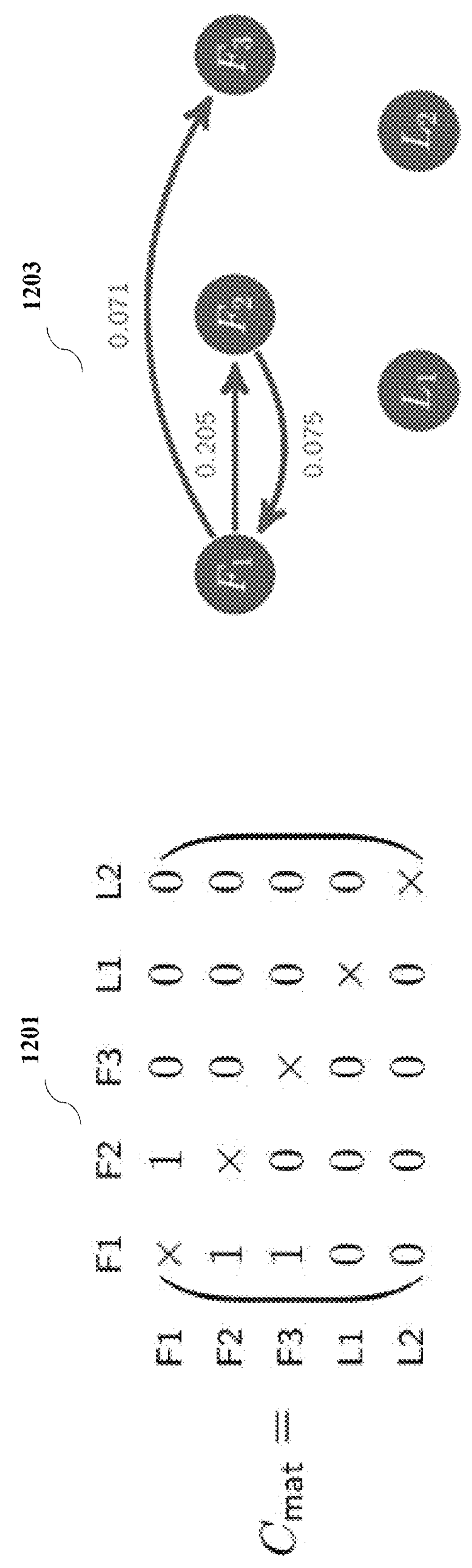
Figure 13:
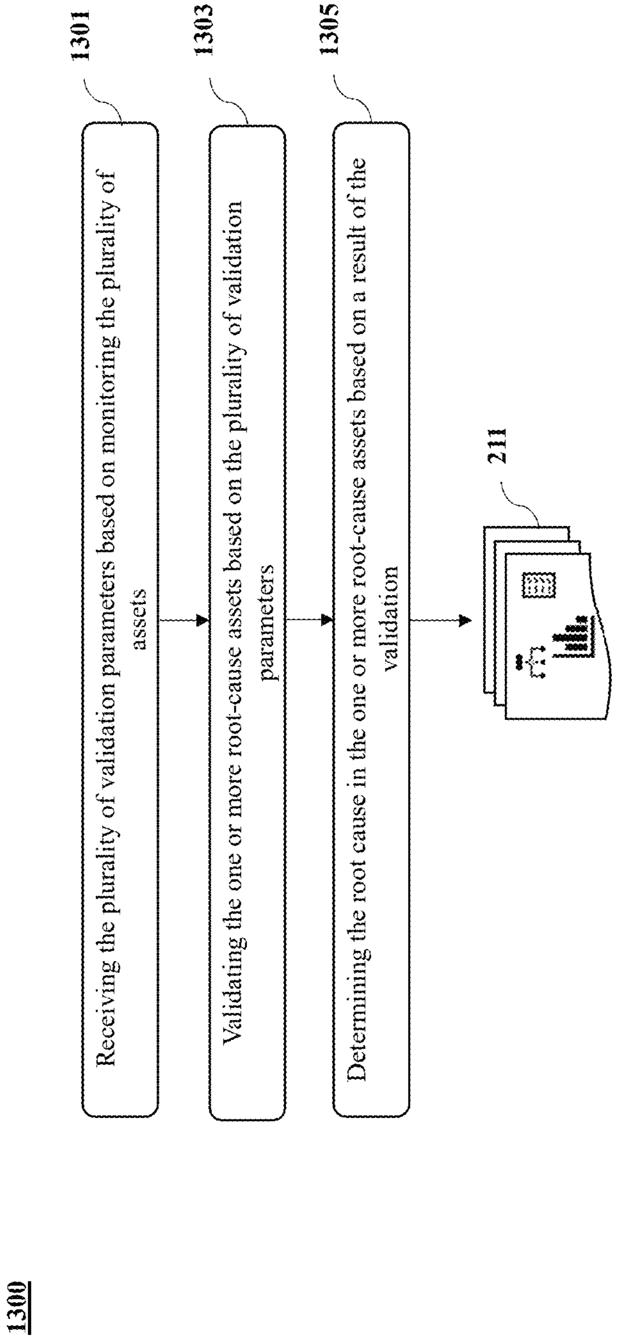
Figure 14:
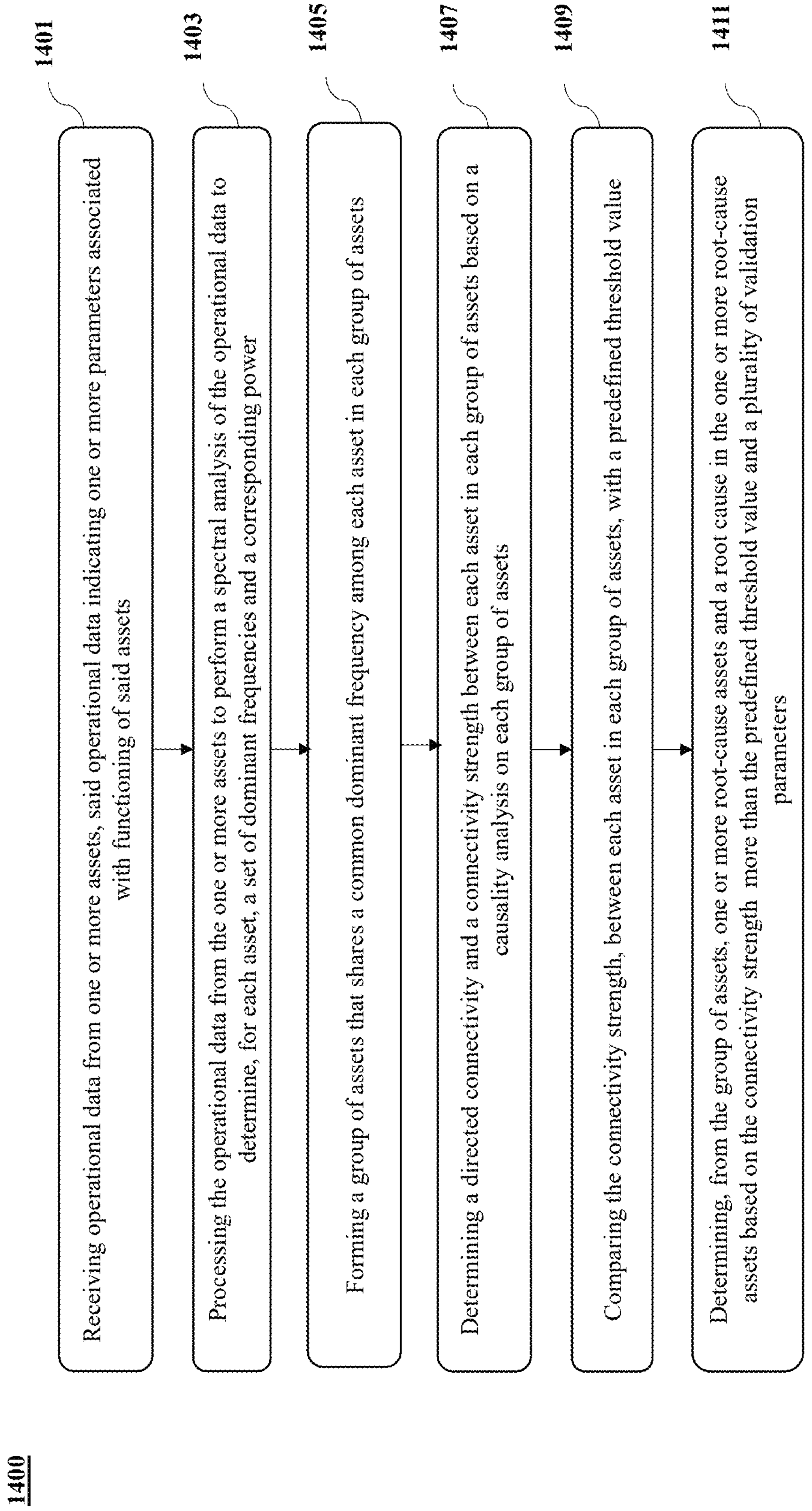
Figure 15:
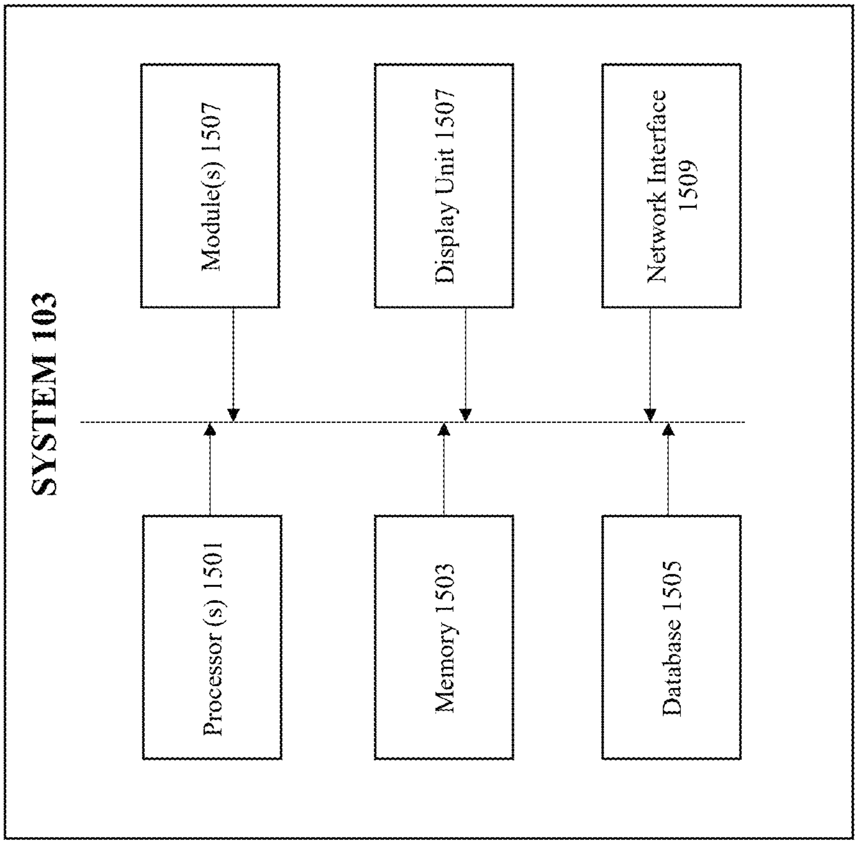

FIG. 4 illustrates a method flow of processing the operational data, according to an embodiment of the present disclosure;

FIG. 5 illustrates various example outputs of the processing of the operational data, according to an embodiment of the present disclosure;

FIG. 6 illustrates a method flow for performing spectral analysis, according to an embodiment of the present disclosure;

FIG. 7 illustrates an example of spectral analysis of the operational data, according to an embodiment of the present disclosure;

FIG. 8 illustrates a method flow for selecting relevant control and cluster common control loops, according to an embodiment of the present disclosure;

FIG. 9 illustrates a method flow of causality analysis, according to an embodiment of the present disclosure;

FIG. 10 illustrates an example of the outcome of causality analysis, according to an embodiment of the present disclosure;

FIG. 11 illustrates a method flow for constructing plant connectivity for each common group, according to an embodiment of the present disclosure;

FIG. 12 illustrates an example of a causality matrix and plant connectivity with nodes and edges, according to an embodiment of the present disclosure;

FIG. 13 illustrates a method flow for detecting root-causes and identifying propagation path, according to an embodiment of the present disclosure;

FIG. 14 illustrates a method for performing a root-cause diagnosis of oscillations in assets included in an industrial process, in accordance with an embodiment of the present disclosure; and FIG. 15 illustrates a general block diagram of the system, according to an embodiment of the present disclosure

DESCRIPTION OF THE INVENTION

The detailed description set forth below in connection with the appended drawings is intended as a description of various embodiments of the present invention and is not intended to represent the only embodiments in which the present invention may be practiced. Each embodiment described in this invention is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details.

Some embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

In one embodiment, the present disclosure discloses a system and a method for the root-cause diagnosis of plant-wide oscillations based on process data. According to an embodiment, the system is configured to include a fully automated tool for the root-cause diagnosis of plant-wide oscillations. According to one aspect of the present disclosure, the system generates a report detailing an identified root cause, propagation paths, and potential reasons for the oscillation at the identified root cause. The automated tool is configured to integrate seamlessly with the performance analytics platform. In an embodiment, the tool reads sensor data from process control loops/units as the process data and autonomously executes a step-by-step analysis using an automated method. In an embodiment the system diagnoses the root cause, identifies propagation paths, and generates a report to resolve the issue associated with the identified root cause.

According to an embodiment, for a given N measurements of M process variables (and/or set points) of control loops in the process, the automated root-cause diagnosis method primarily performs the following key operations:

1. Pre-processing the process data: This is an automated approach where the process data is interpolated. Thereafter, removes outliers, imputes missing data, and assesses stationarity.
2. Performing Spectral Analysis: According to this automated approach, a spectral analysis is performed on the pre-process data for selecting relevant oscillatory control loops and clustering oscillatory loops with common dominant frequencies.
3. Select Relevant and Cluster Common Loops: According to this automated approach, relevant control loops are selected. Thereafter, common control loops are clustered to form a group of common loops.
4. Perform Causality Analysis: According to this automated approach, a causality analysis is performed on each of the common loops to obtain a causal matrix for each common group.
5. Construct Plant Connectivity: According to this automated approach, connectivity of each common group is planted.
6. Detect Root Causes and Identify Propagation Path: According to this automated approach the root cause is detected in the planted connectivity of each common group and then the propagation path is identified.

A detailed explanation of each of the above-mentioned operations will be explained in the forthcoming paragraphs through FIGS. 1-15.

FIG. 1 illustrates an example environment of a system for performing a root-cause diagnosis of oscillations in assets in an industrial process, according to an embodiment of the present disclosure. According to an embodiment, FIG. 1 depicts an environment 100 that includes a plurality of assets (e.g. asset 1 101*a*, asset 2 101*b*, asset 3 101*n*). The 'the plurality of assets' may be collectively labeled as '101'. Further, the 'plurality of assets' may be alternately referred to as 'assets' or 'asset'. As an example, the assets may include transmitters, programmable logic controllers (PLCs), control valves, actuators, PID controllers, and the like.

According to an embodiment, the assets 101 are connected with a plurality of sensors. According to an embodiment, each asset 101 forms a part of a control loop in the industrial process. According to a further non-limiting example, each asset 101 may be operatively coupled with a system 103. In a non-limiting example, the system 103 may be a computer, a laptop, a smartphone, or any electronic machine.

According to an embodiment, each asset 101 acquires operational data. In a non-limiting example, the operational data includes sensor data, control signals, communication signals, pressure signals, data associated with various process variables in the control loop, etc. According to some embodiment, the operational data associated with the assets 101 may be stored in a database 107. The 'operational data' may be alternately referred to as 'process data' throughout the disclosure. In an embodiment, the operational data acquired from at least two or more assets are utilized for performing the root-cause diagnosis of oscillations.

Further, the database 107 may be implemented in the system 103 or virtually implemented in a cloud server 109. According to an example embodiment, FIG. 1 depicts that the performance analytics platform 110 is implemented in the system 103. According to an embodiment, the method may be implemented on a performance analytics platform 110. As an example, the performance analytics platform 110 may be implemented in a laptop, a desktop computer, a cloud server, or a central server.

The performance analytics platform 110 is a comprehensive system that collects, integrates, and analyzes data from various sources within the industrial environment to provide real-time monitoring, advanced analytics, and actionable insights. It enables the optimization of industrial process performance by identifying patterns, root-cause assets, and root-cause. The performance analytics platform further facilitates visualization, reporting, and integration with control systems. The platform's capabilities encompass predictive maintenance, energy saving, and process enhancements that further increase efficiency, and ensure the reliability and safety of the operations.

FIG. 2 illustrates an example block diagram of the system depicted in FIG. 1, in accordance with an embodiment of the present disclosure. According to an embodiment, the system 103 includes a monitoring module 201, a processing module 203, a determination module 207, an analysis module 205, and an output module 209. According to an embodiment, the monitoring module 201, the processing module 203, the determination module 207, the analysis module 205, and the output module 209 are operatively coupled with each other. According to one or more embodiments, the monitoring module 201, the processing module 203, the determination module 207, the analysis module 205, and the output module 209 are uniquely designed hardware modules or software modules.

According to some embodiments, functions of the monitoring module 201, the processing module 203, the determination module 207, the analysis module 205, and the output module 209 can be performed by the processor(s). Further, according to some embodiment, the monitoring module 201, the processing module 203, the determination module 207, the analysis module 205, and the output module 209 are integrated with the performance analytics platform. Further, an explanation will be made by referring to modules as depicted in FIG. 2. Furthermore, the labels depicted in the representative drawings are kept the same for similar components throughout the disclosure for ease of understanding. A brief explanation of each of the modules as depicted in FIG. 2 will be explained in the forthcoming paragraphs.

According to an embodiment, the monitoring module 201 monitors assets 101 periodically and acquires the operational data. In particular, the monitoring module 201 reads sensor data from process control loops/units, which is further stored in the database 107. As an example, the operational data stored in the database 107 may be referred to as historian data or historical data. In an embodiment, the Process variables (PV) and Set Point (SP) data may be extracted from the operational data. The process variables are referred to as measurements, for example, but are not limited to, temperature, pressure, flow rate, and levels that are being controlled or monitored by the control loops associated with the assets. Further, the set points are the target value set for the process variables that are desired to be maintained for the efficient working of the assets.

According to an embodiment, the processing module 203, processes the operational data from the at least two or more assets among the plurality of assets. According to an example embodiment, the operational data of at least two or more assets are utilized for the processing. The operational data is interpolated. Further, the processing module 203 removes outliers, imputes missing data, computes error data, and assesses stationarity. For example, the outliers can occur due to mode and shutdown conditions. Further, the missing data can occur when the operational data is continuously missing for a predefined time period (e.g. 1 hour). In an embodiment, the error data can occur when there is a difference between PV and SP data. Further, the operational data can change with time, the processing module 203 performs various operations like autocorrelation or partial correlation.

According to an embodiment, the analysis module 205 performs spectral analysis on the operational data to determine, for each asset of the plurality of assets, a set of dominant frequencies and a corresponding power. In an embodiment, the dominant frequencies indicate anomalous vibrations occurring in each asset 101 and the corresponding power indicates a power associated with the anomalous vibrations. The analysis module 205 further selects relevant assets and clusters those assets in one or more groups. In an embodiment, each asset 101 in a group shares a common dominant frequency among each other. Further, the analysis module 205 performs a casualty analysis on each group of assets 101. In an embodiment, the analysis module 205 determines interconnections between each asset 101 and a connectivity strength between each asset 101 based on the casualty analysis.

In an embodiment, the determination module 207 determines one or more root-cause assets 101 and a root cause in the one or more root-cause assets 101 based on the connectivity strength which is more than a predefined threshold value. Further, the determination module 207 considers validation parameters to determine the one or more root-cause assets 101 and the root cause. As an example, the validation parameters include at least one of the stiction data, over-tuned data, and external disturbances data. In an embodiment, the validation parameter may be obtained by periodic monitoring of the assets 101 by the monitoring module 201.

In an embodiment, the output module 209 generates a report 211. In an embodiment, the report 211 includes the one or more root-cause assets and the root cause in the one or more root-cause assets. Further, the output module 209 may be coupled with a display to display the report 211.

FIG. 3 illustrates a general operational flow 300 for performing a root-cause diagnosis of oscillations in assets in an industrial process, according to an embodiment of the present disclosure. According to an embodiment, method 300 is implemented in the system 103. A brief explanation of the operational flow 300 will be explained by referring to FIGS. 1 and 2 in the forthcoming paragraphs.

According to an embodiment, the operation 301 is implemented with the processing module 203. In an embodiment, at operation 301, the operational data is provided as an input for processing. In an embodiment, at operation 301, the operational data is interpolated. Further, any outliers, missing data, and error in the operational data are detected and removed from the operational data. Further, in a case, when the operational data is not in a standard format then, the operational data is transformed. Accordingly, the operation 301, outputs the processed data.

According to a further embodiment, operation 303 is implemented with the analysis module 205. In an embodiment, the processed data obtained at operation 301 is provided as input. According to an embodiment, at operation 303, a spectral analysis is performed on the processed data to determine dominant frequencies and the corresponding power associated with assets 101. The spectral analysis provides details regarding anomalous vibrations that might be occurring in assets 101. This further aids in effectively detecting and diagnosing the root-cause assets. Accordingly, the operation 303, outputs a set of dominant frequencies and their corresponding power.

According to an embodiment, operation 305 is implemented with the analysis module 205. Further, the set of dominant frequencies and their corresponding powers is taken as input at operation 305. In an embodiment, at operation 305, the one or more assets are selected based on the corresponding powers in the set of dominant frequencies. The control loops associated with the selected one or more assets are relevant control loops. In an embodiment, the operation 305 further clusters each asset comprised in each group of assets that shares a common dominant frequency to form a group of assets. Accordingly, the operation 305, outputs the groups of assets.

According to a further embodiment, operation 307 is implemented with the analysis module 205. In an embodiment, the groups of assets is taken as input from the previous operation. According to an embodiment, at operation 307 a causal analysis is performed on each group of assets to determine directed connectivity and connectivity strength between each asset in each group of assets. The directed connectivity indicates a direction of flow of signals or information between different assets in the control loop. Further, the connectivity strength indicates the strength between each asset. Further, at operation 307, a causal matrix is generated. The casual matrix indicates interconnections between each asset and the connectivity strength between each asset. Accordingly, the operation 307 outputs the causal matrix.

According to a further embodiment, operation 309 is implemented with the analysis module 205. In an embodiment, the causal matrix is taken as an input from the previous operation. In an embodiment, at operation 307, a plant connectivity is constructed for each common group based on the causal matrix. The plant connectivity represents signal flow and connectivity strength between the assets in the common group. The assets having a low connectivity strength can be omitted from the next processing. Accordingly, the operation 309 outputs the plant connectivity.

According to a further embodiment, operation 311 is implemented with the determination module 207. In an embodiment, at operation 311, a causal flow and propagation path is determined by using the plant connectivity. Further, in operation 311 the one or more root-cause assets and a root cause in the one or more root-cause assets are determined based on the casual flow, plant connectivity, and connectivity strength. Accordingly, the operation 311 outputs the one or more root-cause assets and a root cause in the one or more root-cause assets.

The forthcoming paragraphs describe each operation of FIG. 3 in detail.

FIG. 4 illustrates a method flow 400 of processing the operational data, according to an embodiment of the present disclosure. According to an embodiment, method 400 depicts an operation 301 of FIG. 3 for processing the operational data.

In an embodiment, as explained above the monitoring module 201 reads sensor data from process control loops/units, which is further stored in the database 107. Further, as explained above, the processing module 203 extracts PV and SP from the operational data.

According to an embodiment of the present disclosure, at operation 401, the processing module 203 performs interpolation on the PV and SP data. In an embodiment, for performing the interpolation, the operational data is mapped with different sampling intervals.

Further, at operation 403, the processing module 203 detects at least one of the outliers and the missing data based on the interpolation of the operational data. As an example, the outliers can occur due to mode and shutdown conditions. Accordingly, when the mode and shutdown conditions occur in system 103, the processing module 203 detects the outliers. As a further example, for detecting the missing data, the processing module 203 monitors whether the operational data is continuously missing for the predefined time period. Accordingly, if the processing module 103 determines that the operational data, that is continuously missing, is less than the predefined time period, then the operational data is imputed. On the other hand, if the system determines that the process data that is continuously missing is more than the predefined time period then the process data is removed. According to some embodiment, the asset 101 is removed if the overall percentage of the missing data is more than 60%. Thus, at operation 405, the processing module 203 removes the at least one of the outliers and missing data from the operational data based on the result of the detection.

Further, at operation 407, the processing module 203, computes error data, scale the data, and checks for stationarity after removal of the outliers and missing data. In particular, for computing the error data, the processing module 203 determines the difference in the PV and SP data with respect to real-time PV and SP data. The difference value, in the PV and SP data with respect to real-time PV and SP data, is computed as the error data. Further, the processing module 203 checks the stationarity of the operational data by using autocorrelation and partial correlation functions. If the operational data is non-stationary, then appropriate transformation is used to transform to the stationary data. For example, a slow decaying nature of the autocorrelation function and the partial correlation value of 1 at lag 1 may suggest that the data may be non-stationary.

In general, the autocorrelation function is defined as the correlation between two data points within a signal. It is primarily employed to evaluate the linear similarity between two samples of data. Additionally, it is utilized to analyze the correlation structure within the data of a signal or variable. Thus, autocorrelation can be used to estimate missing values by finding patterns or correlations within the signal. Further, by analyzing the autocorrelation function of the signal, one can extrapolate missing data points based on the correlation patterns observed in the signal. Further, the partial correlation is a statistical technique to measure the relationship between two variables while controlling for the influence of one or more additional variables. It is used to assess the strength of a relationship between two variables after removing the effect of the other variables. The partial correlation coefficient quantifies the strength of the linear relationship between two variables while accounting for the influence of other relevant variables. This is particularly useful in situations where the relationship between two variables may be confounded by the influence of other factors.

In an embodiment, at step 409, the processing module 203 scales operational data in case the error data is computed. Accordingly, the processing module 203 generates processed data, at operation 411, after performing operations 401 to operations 409.

FIG. 5 illustrates various example outputs of the processing of the operational data, according to an embodiment of the present disclosure. As an example, block 501 shows the operational data. Further, block 503, shows the extracted PV and SP data. Further, blocks 505 and 507 depicted the output of the implemented autocorrelation and the partial correlation function for evaluating the linear similarity between two samples of data.

FIG. 6 illustrates a method flow for performing spectral analysis, according to an embodiment of the present disclosure. According to an embodiment, method 600 depicts the operation 301 of FIG. 3 for spectral analysis.

According to an embodiment, at operation 601, the analysis module 205, estimates, for each asset, a power spectrum from the operational data by using spectral analysis techniques. For estimating the power spectra, the auto-correlation is performed on the processed data associated with each asset. Further, at operation 603, the analysis module 205, extracts the one or more dominant frequencies and corresponding power for each asset. Further, a set of dominant frequencies and the corresponding power are determined from the one or more dominant frequencies. In a non-limiting example, ten dominant frequencies and corresponding power may be extracted from one or more dominant frequencies of the power spectra. The extracted dominant frequencies and corresponding power are then used for further operations.

FIG. 7 illustrates an example of spectral analysis of the operational data, according to an embodiment of the present disclosure. Blocks 701 and 703 illustrate an autocorrelated output of the processed data after performing autocorrelation and power spectra. As can be seen, at block 703 dominant frequencies 705 for variables (i.e. assets) F1, F2, F3, L1, and L2 are shown within a circle as the frequencies estimated are maximum than other neighboring frequencies. According to an embodiment, Further, for variable F1, a set comprising two dominant frequencies is estimated. In a further example, for variable L2 a set comprising three dominant frequencies is estimated. Further, for each dominant frequency, the corresponding power is also estimated using known techniques.

FIG. 8 illustrates a method flow for selecting relevant control and cluster common control loops, according to an embodiment of the present disclosure. According to an embodiment, method 800 depicts an operation 305 for selecting relevant control and clustering common control loops.

In an embodiment, at operation 801, the analysis module 205, compares the corresponding power of each dominant frequency of the set of dominant frequencies with a predefined maximum power. More particularly, a significant power of each of the corresponding process variables associated with the assets is determined and cross-validated them using their existing oscillation index (OSI) report. According to an embodiment, the analysis module 205 determines the significant power for each of the corresponding process variables based on a determination of whether the corresponding power of the extracted dominant frequencies is approximately one-third of the maximum predefined power. Accordingly, at operation 803, the analysis module 205 selects one or more assets from the plurality of assets based on the comparison that the corresponding power is greater than at least one-third of the predefined maximum power. The selected one or more assets are the relevant control loops associated with the assets 101 and have a corresponding power greater than at least one-third of the predefined maximum power.

Further, at operation 805, the analysis module 205, forms the group of assets from the one or more assets. In particular, the analysis module 205 clusters each asset to form a group of assets that shares the common dominant frequency within a group. Table 1 depicts an example of grouping common control loops.

TABLE 1

| | Top dominant frequencies (periods in minutes) | | | | |
|---|---|---|---|---|---|
| | Freq1 | Freq2 | Freq3 | Freq4 | Freq5 |
| F1 | 3.6312 | 2.8927 | 3.7647 | 3.9084 | 2.6667 |
| F2 | 2.8927 | 2.8132 | 3.6571 | 3.0296 | 2.6528 |
| F3 | 3.4133 | 3.7372 | 3.6056 | 3.5068 | 2.7978 |
| L1 | 3.5310 | 3.0296 | 3.3247 | 2.8764 | 1.3951 |
| L2 | 2.3063 | 2.6256 | 2.0562 | 3.1411 | 2.1787 |

As can be seen from the Table 1, there is a common dominant frequency of 2.8927 between F1 and F2. Thus, variables F1 and F2 are clustered forming the common control group.

FIG. 9 illustrates a method flow of causality analysis, according to an embodiment of the present disclosure. According to an embodiment, method 900 depicts the operation 307 of FIG. 3 for causality analysis.

According to an embodiment, at operation 901, the analysis module 205 builds a multivariate time series model for each group of assets. Further, the analysis module 205 determines the directed connectivity, and the connectivity strength between each asset in the group of assets is determined by using the multivariate time series mode.

In a non-limiting example, the multivariate time series model may be a vector autoregressive (VAR) model. An explanation is provided with respect to the VAR model, however the same should not be construed as limiting.

As an example, consider that $z[k]=(z_1[k], z_2[k], \ldots, z_M[k])^T$ be error data (SP-PV) of process control loops. Then, the vector autoregressive (VAR) representation for this is given by, $$z[k] = \sum_{r=1}^{P} A_r z[k-r] + e[k] \tag{1}$$

where, $$A_r = \begin{pmatrix} a_{11}(r) & a_{12}(r) & \cdots & \cdots & a_{1M}(r) \\ \vdots & \vdots & \vdots & \vdots & \vdots \\ \vdots & \vdots & \vdots & \vdots & \vdots \\ a_{M1}(r) & a_{M2}(r) & \cdots & \cdots & a_{MM}(r) \end{pmatrix}$$

In equation (1) Ar is the M×M autoregressive coefficient matrix at lag r and coefficients $a_{ij}(r)$ represent the linear influence of $z_j$ onto $z_i$ at lag r, P is the order of the process, and e[k] is an M-dimensional vector white noise (VWN) process with covariance $\Sigma_e$.

In an embodiment, the order of the model, P, can be selected using the standard information-theoretic criteria. For example, an Akaike information criterion and Bayesian (or Schwartz) information criterion (BIC), both of which are closely related.

$$AIC(P) = N\ln(\det\Sigma_e) + 2M^2P \tag{2}$$

$$BIC(P) = N\ln(\det\Sigma_e) + \ln(N)M^2P \tag{3}$$

where N is the number of observations. In an embodiment, the innovations covariance matrix $\Sigma_e$, is not generally known and is estimated along with the model coefficients.

In an embodiment, the data pathway function (DPF) from the source to sink is defined as, $$\psi_{ij}(\omega) \triangleq \psi_{i\to j}(\omega) = \frac{h_{D,ij}(\omega)}{\sqrt{\sum_{i=1}^{M} |h_{D,ij}(\omega)|^2}} \tag{4}$$

The magnitude-squared DPF, $|\psi_{ij}(\omega)|^2$, is used as a causality measure, in the sense that $z_j$ Granger causes $z_i$ if and only if $|\psi_{ij}(\omega)|^2 \neq 0$ for at least one ω. The magnitude-squared DPF is a bounded measure and satisfies the following properties:

$$0 \leq |\psi_{ij}(\omega)|^2 \leq 1 \qquad \text{(5) and (6)}$$

$$\sum_{i=1}^{M} |\psi_{ij}(\omega)|^2 = 1 \quad \text{for all } 1 \leq j \leq M.$$

Where $$H(\omega) = A^{-1}(\omega) \qquad \text{(7) and (8)}$$

$$h_{ij}(\omega) = h_{D,ij}(\omega) + h_{I,ij}(\omega)$$

where $h_{D,ij}(\omega)$ is the frequency response function of the direct pathway from $e_j$ to $z_i$, and $h_{I,ij}(\omega)$ is the frequency response function of the indirect pathway.

In an embodiment, the strength of causal connection ζij along (i, j) pathway that quantifies the amount of power transfer from the source variable to the sink is given as:

$$\zeta_{ij} = \frac{1}{\pi}\int_0^{\pi} |\psi_{ij}(\omega)|^2 d\omega \tag{9}$$

In equation (9) $|\psi_{ij}(\omega)|^2$ is the direct power transfer from a source variable to a sink. The strength satisfies the following properties $$0 \le \zeta_{ij} \le 1 \tag{10}$$

$$\sum_{i=1}^{M} \zeta_{ij} = 1 \quad \text{for all } 1 \le j \le M. \tag{11}$$

Thus, the strength is always positive and theoretically, it is zero when the causal connection does not exist between the variables. The strength (weight) is a measure of the normalized power transfer from the source (causal) variable directly to the sink (effect).

According to an embodiment, based on the above-modelled VAR model, various parameters such as coefficients, and statistical values are estimated, which is further utilized for determining the directed connectivity and the connectivity strength.

Further at operation 903, the analysis module 205 constructs a causal matrix from the connectivity strength and the directed connectivity. In an embodiment, if the causal strength is more than 0.1 then the value is considered as 1 else 0. Further, the casual matrix is indicative of interconnections between each asset and the connectivity strength between each asset 101.

FIG. 10 illustrates an example of the outcome of causality analysis, according to an embodiment of the present disclosure. As can be seen causal strength from F1 to F2 is high i.e. 0.205. Further, the causal strength from F2 and F1 is low i.e. 0.075. Furthermore, the causal strength from F1 and F3 is also low i.e. 0.071.

FIG. 11 illustrates a method flow for constructing plant connectivity for each common group, according to an embodiment of the present disclosure. The method 1100 shows an operation 309 of FIG. 3 for constructing plant connectivity for each common group.

According to an embodiment, at operation 1103, the analysis module 205 constructs plant connectivity with nodes and edges by using the casual matrix 1101 obtained for each common group. In an embodiment, the control loops are considered as nodes, the directed edge between control loops if the corresponding element in the causal matrix is 1. Accordingly, the plant connectivity 1105 with nodes and edges 803 is obtained.

FIG. 12 illustrates an example of a causality matrix and plant connectivity with nodes and edges, according to an embodiment of the present disclosure. As can be seen in casualty matrix 1201, the connection between F1 and F2 is considered as 1 and F1 and F3 are also considered as 1 as the connectivity strength is within a predefined range. The same can be referred to by the signal flow shown at block 1203. As can be seen, the connectivity strength from F1 and F2 is 0.205, from F2 to F1 is 0.075, and from F1 to F3 is 0.071. Therefore, the connectivity strength from F2 to F1 is 0.075 is low and hence it is omitted and shown with 0 in the casual matrix 1201.

According to an embodiment, the analysis module 205 takes the plant connectivity with nodes and edges as obtained above as an input, and computes casual flow for each node. In an example, the causal flow is given by equation (11).

$$\text{Causal flow} = \text{outgoing flow} - \text{incoming flow} \tag{11}$$

FIG. 13 illustrates a method flow for detecting root-causes and identifying propagation path, according to an embodiment of the present disclosure. Method 1300 shows the operation 311 of FIG. 3 for detecting root-causes and identifying propagation paths.

According to an embodiment, the determination module 207 compares the connectivity strength with a predefined threshold value. The determination module 207 detects the root-cause assets when the connectivity strength is more than a predefined threshold value as the oscillation in that asset will be more than the predefined threshold value. Thus, the determination module 207 determines the root-cause assets and root cause based on the casual flow, the plant connectivity, and connectivity strength. However, the same is further validated by using validation parameters before generating the report.

Accordingly, at operation 1301, the determination module 207 receives the plurality of validation parameters based on the monitoring of the plurality of assets. Further, at operation 1303, the determination module 207 validates the one or more root-cause assets based on the plurality of validation parameters. Further, at operation 1305, the determination module 207 determines the root cause in the one or more root-cause assets based on the validation parameter and the connectivity strength is more than a predefined threshold value.

According to the example embodiment, variable F1 is a root cause asset. Further, F1→F2, F1→F3 is the determined propagation path where the oscillations occur. Accordingly, by gathering the information of the root cause asset and root cause in it, an appropriate action can be taken by an authorized entity.

According to a further embodiment, the output module 209, generates the report 211 which includes one or more root-cause assets and the root cause in the one or more root-cause assets.

FIG. 14 illustrates a method for performing a root-cause diagnosis of oscillations in assets in an industrial process, in accordance with an embodiment of the present disclosure. The method 1400 is implemented in the system 103 of FIGS. 1 and 2. According to an embodiment, the method 1400 may be implemented with the processor(s), various modules. An explanation of the various modules is explained through FIGS. 1-13, therefore detailed explanation of the same is omitted here for the sake of brevity.

According to an embodiment of the present disclosure, at operation 1401, the method 1400 includes, receiving operational data from at least two or more assets among the plurality of assets, said operational data indicating one or more parameters associated with functioning of said assets. A detailed explanation is provided with reference to the receiving module 201.

Further, at operation 1403, the method 1400 includes, processing the operational data from the at least two or more assets to perform a spectral analysis of the operational data to determine, for each asset of the plurality of assets, a set of dominant frequencies and a corresponding power, where the dominant frequencies indicate anomalous vibrations occurring in each asset and the corresponding power indicates a power associated with the anomalous vibrations.

In an embodiment, for processing the operational data associated with each asset, the operation 1403 includes receiving the operational data from a plurality of sensors connected with the plurality of assets. Further, the operation 1403 includes detecting at least one of the outliers and missing data by interpolating the operational data. Further, the operation 1403 includes removing, from the operational data, at least one of the outliers and missing data based on the result of the detection. Further, the operation 1403 includes computing error data based on a result of the removal of the at least one of the outliers and missing data and scaling the operational data based on the error data. A detailed explanation is provided with reference to operations related to the processing module 203 and FIG. 4.

According to an embodiment, for performing the spectral analysis of the operational data, the method 1400 includes estimating, for each asset, a power spectrum from the operational data by using spectral analysis techniques and extracting the one or more dominant frequencies for each asset. The set of dominant frequencies and the corresponding power are determined from the one or more dominant frequencies. A detailed explanation of the spectral analysis is explained by referring to operations related to the analysis module 205 and FIG. 6.

In an embodiment, after processing the operational data, at operation 1405, the method 1400 includes forming a group of assets that shares a common dominant frequency among each asset in each group of assets. In an embodiment, for forming the group of assets that shares the common dominant frequency, the operation 1405 includes comparing the corresponding power of each dominant frequency of the set of dominant frequencies with a predefined maximum power. Further, the operation 1405 includes selecting one or more assets from the plurality of assets based on the comparison that the corresponding power is greater than at least one-third of the predefined maximum power. Further, the operation 1405, includes forming the group of assets from the one or more assets, where each asset comprised in each group of assets shares the common dominant frequency within a group. A detailed explanation of the operation 1405 can be referred to through the operation related to the analysis module 205 and FIG. 8.

According to a further embodiment, at operation 1407, the method 1400 includes determining the directed connectivity and the connectivity strength between each asset in each group of assets based on the causality analysis on each group of assets. In an embodiment, the casualty analysis comprises building a multivariate time series model for each group of assets. In an embodiment, the directed connectivity and the connectivity strength between each asset in the group of assets are determined by using the multivariate time series model. Further, the operation 1407 includes generating the casual matrix for each group of assets based on the connectivity strength and the directed connectivity. A detailed explanation of the operation 1407 can be referred to through FIGS. 9-11.

According to a further embodiment, at operations 1409 and 1411, the method 1400 includes comparing the connectivity strength, between each asset in each group of assets, with a predefined threshold value. Further, determining, from the group of assets, one or more root-cause assets and a root cause in the one or more root-cause assets based on the connectivity strength more than the predefined threshold value and a plurality of validation parameters. A detailed explanation of the operations 1409 and 1411 can be referred to through operations related to the determination module 207.

The disclosed techniques improve the overall process performance and production efficiency. More particularly, the present disclosure discloses an automated method for the root-cause diagnosis of the plant-wide oscillations in the control loop based on the process data. The root-cause diagnosis identifies the core cause loop(s)/unit(s) that, if addressed, can prevent the occurrence and propagation of oscillations in the control loops, units, and plant-wide systems.

The disclosed system and method improve overall process performance and production efficiency by efficiently detecting and diagnosing the root causes of the plant-wide oscillations and addressing associated issues. The system further enhances operational efficiency, mitigates safety risks, and minimizes production losses and costs.

FIG. 15 illustrates a general block diagram of the system, according to an embodiment of the present disclosure.

In an example, the processor(s) 1501 may be a single processing unit or a number of units, all of which could include multiple computing units. The processor(s) 1501 may be implemented as one or more microprocessors, microcomputers, microcontrollers, digital signal processors, central processing units, logical processors, virtual processors, state machines, logic circuitries, and/or any devices that manipulate signals based on operational instructions. Among other capabilities, the processor(s) 1501 is configured to fetch and execute computer-readable instructions and data stored in the memory 1503.

The memory 1503 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

In an example, the module(s), engine(s), and/or unit(s) 1507 may include a program, a subroutine, a portion of a program, a software component or a hardware component capable of performing a stated task or function. As used herein, the module(s), engine(s), and/or unit(s) may be implemented on a hardware component such as a server independently of other modules, or a module can exist with other modules on the same server, or within the same program. The module(s), engine(s), and/or unit(s) 1503 may be implemented on a hardware component such as processor one or more microprocessors, microcomputers, microcontrollers, digital signal processors, central processing units, state machines, logic circuitries, and/or any devices that manipulate signals based on operational instructions. The module(s), engine(s), and/or unit(s) 1503 when executed by the processor(s) 1501 may be configured to perform any of the described functionalities. According to an embodiment, the module 1503 includes the monitoring module 201, the processing module 203, the analysis module 205, the determination module 207, and the output module 209. In an alternate embodiment, the functions of the aforesaid modules may be performed by the processor(s) 1501.

As a further example, the database 1505 may be implemented with integrated hardware and software. The hardware may include a hardware disk controller with programmable search capabilities or a software system running on general-purpose hardware. Examples of databases are but are not limited to, in-memory databases, cloud databases, distributed databases, embedded databases, and the like. The database amongst other things, serves as a repository for storing data processed, received, and generated by one or more of the processor(s) 1501, and the modules/engines/units 1505.

The modules/engines/units 1505 may be implemented with an AI module that may include a plurality of neural network layers. Examples of neural networks include, but are not limited to, a convolutional neural network (CNN), a deep neural network (DNN), a recurrent neural network (RNN), a Restricted Boltzmann Machine (RBM). The learning technique is a method for training a predetermined target device using a plurality of learning data to cause, allow, or control the target device to make a determination or prediction. Examples of the learning techniques include, but are not limited to, a supervised learning, unsupervised learning, a semi-supervised learning, or reinforcement learning. At least one of a plurality of CNN, DNN, RNN, RMB models and the like may be implemented to thereby achieve execution of the present subject matter's mechanism through an AI model. A function associated with the AI model may be performed through the non-volatile memory, the volatile memory, and the processor. The processor may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or the artificial intelligence (AI) model stored in the non-volatile memory and the volatile memory. The predefined operating rule or artificial intelligence model is provided through training or learning.

As an example, the display unit 1507 includes a computer monitor, a touch screen, an output device capable of displaying the graphics, and the like. The display unit 1007 is configured to display visual output in desktops, laptops, and workstations. The display unit 1007 may come in different sizes, resolutions, and types (such as LCD, LED, or OLED).

As a further example, the network interface 1509 is configured to provide and establish communication with any electronic device via a public network, private network, or any wireless communication technology.

The figures of the disclosure are provided to illustrate some examples of the invention described. The figures are not to limit the scope of the depicted embodiments of the appended claims. Aspects of the disclosure are described herein with reference to the invention to example embodiments for illustration. It should be understood that specific details, relationships, and methods are set forth to provide a full understanding of the example embodiments. One of ordinary skills in the art recognize the example embodiments can be practiced without one or more specific details and/or with other methods.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Aspects of the present disclosure may be implemented as computer program products that comprise articles of manufacture. Such computer program products may include one or more software components including, for example, applications, software objects, methods, data structure, and/or the like. In some embodiments, a software component may be stored on one or more non-transitory computer-readable media, which computer program product may comprise the computer-readable media with software component, comprising computer executable instructions, included thereon. The various control and operational systems described herein may incorporate one or more of such computer program products and/or software components for causing the various conveyors and components thereof to operate in accordance with the functionalities described herein.

A software component may be coded in any of a variety of programming languages. An illustrative programming language may be a lower-level programming language such as an assembly language associated with a particular hardware architecture and/or operating system platform/system. Other example of programming languages include, but are not limited to, a macro language, a shell or command language, a job control language, a scripting language, a database query, or search language, and/or report writing language. In one or more example embodiments, a software component comprising instructions in one of the foregoing examples of programming languages may be executed directly by an operating system or other software component without having to be first transformed into another form. A software component may be stored as a file or other data storage methods. Software components of a similar type or functionally related may be stored together such as, for example, in a particular directory, folder, or repository. Software components may be static (e.g., pre-established, or fixed) or dynamic (e.g., created or modified at the time of execution).

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A method for performing a root-cause diagnosis of oscillations in a plurality of assets included in an industrial process, the method comprising:

receiving operational data from at least two or more assets among the plurality of assets, said operational data indicating one or more parameters associated with functioning of said assets;

processing the operational data from the at least two or more assets to perform a spectral analysis of the operational data to determine, for each asset of the plurality of assets, a set of dominant frequencies and a corresponding power, wherein the dominant frequencies indicate anomalous vibrations occurring in each asset and the corresponding power indicates a power associated with the anomalous vibrations;

forming a group of assets that shares a common dominant frequency among each asset in each group of assets;

determining a directed connectivity and a connectivity strength between each asset in each group of assets based on a causality analysis on each group of assets;

comparing the connectivity strength, between each asset in each group of assets, with a predefined threshold value; and determining, from the group of assets, one or more root-cause assets and a root cause in the one or more root-cause assets based on the connectivity strength more than the predefined threshold value and a plurality of validation parameters.

2. The method of claim 1, wherein processing the operational data from the at least two or more assets comprises:

receiving the operational data from a plurality of sensors connected with the at least two of more assets;

detecting at least one of the outliers and missing data by interpolating the operational data;

removing, from the operational data, at least one of outliers and missing data based on the result of the detection;

computing error data based on a result of the removal of the at least one of outliers and missing data; and scaling the operational data based on the error data.

3. The method of claim 1, wherein the spectral analysis of the operational data comprises:

estimating, for each asset, a power spectrum from the operational data by using spectral analysis techniques; and extracting the one or more dominant frequencies for each asset, wherein the set of dominant frequencies and the corresponding power are determined from the one or more dominant frequencies.

4. The method of claim 1, wherein forming the group of assets that shares a common dominant frequency comprises:

comparing the corresponding power of each dominant frequencies of the set of dominant frequencies with a predefined maximum power;

selecting one or more assets from the plurality of assets based on the comparison that the corresponding power is greater than at least one-third of the predefined maximum power; and forming the group of assets from the one or more assets, wherein each asset comprised in each group of assets shares the common dominant frequency within a group.

5. The method of claim 1, wherein the causality analysis comprises:

building a multivariate time series model for each group of assets, wherein the directed connectivity and the connectivity strength between each asset in the group of assets are determined by using the multivariate time series model; and generating a casual matrix for each group of assets based on the connectivity strength and the directed connectivity.

6. The method of claim 5, wherein the casual matrix is indicative of interconnections between each asset and the connectivity strength between each asset.

7. The method of claim 1, wherein determining the root cause in the one or more root-cause assets comprises:

receiving the plurality of validation parameters based on monitoring the plurality of assets, wherein the plurality of validation parameters include at least one of stiction data, over-tuned data, and external disturbances data;

validating the one or more root-cause assets based on the plurality of validation parameters; and determining the root cause in the one or more root-cause assets based on a result of the validation.

8. The method of claim 1, further comprising:

generating a report comprising the one or more root-cause assets and the root cause in the one or more root-cause assets.

9. A system for performing a root-cause diagnosis of oscillations in a plurality of assets included in an industrial process, the system comprising:

one or more processors;

a memory; and one or more programs stored in the memory, the one or more programs when executed by the one or more processors, cause the one or more processors to:

receive operational data from the at least two or more assets among the plurality of assets, said operational data indicating one or more parameters associated with functioning of said assets;

process the operational data from the at least two or more assets to perform a spectral analysis of the operational data to determine, for each asset of the plurality of assets, a set of dominant frequencies and a corresponding power, wherein the dominant frequencies indicate anomalous vibrations occurring in each asset and the corresponding power indicates a power associated with the anomalous vibrations;

form a group of assets that shares a common dominant frequency among each asset in each group of assets;

determine a directed connectivity and a connectivity strength between each asset in each group of assets based on a causality analysis on each group of assets;

compare the connectivity strength, between each asset in each group of assets, with a predefined threshold value; and determine, from the group of assets, one or more root-cause assets and a root cause in the one or more root-cause assets based on the connectivity strength more than the predefined threshold value and a plurality of validation parameters.

10. The system of claim 9, wherein to process the operational data from the at least two or more assets, the one or more processors are configured to:

receive the operational data from a plurality of sensors connected with the at least two or more assets;

detect at least one of the outliers and missing data by interpolating the operational data;

remove, from the operational data, at least one of outliers and missing data based on the result of the detection;

compute error data based on a result of the removal of the at least one of outliers and missing data; and scale the operational data based on the error data.

11. The system of claim 9, wherein for the spectral analysis of the operational data, the one or more processors are configured to:

estimate, for each asset, a power spectrum from the processed data by using spectral analysis techniques; and extract the one or more dominant frequencies for each asset, wherein the set of dominant frequencies and the corresponding power are determined from the one or more dominant frequencies.

12. The system of claim 9, wherein to form the group of assets that shares a common dominant frequency, the one or more processors are configured to:

compare the corresponding power of each dominant frequencies of the set of dominant frequencies with a predefined maximum power;

select one or more assets from the plurality of assets based on the comparison that the corresponding power is greater than at least one-third of the predefined maximum power; and form the group of assets from the one or more assets, wherein each asset comprised in each group of assets shares the common dominant frequency within a group.

13. The system of claim 9, wherein for the causality analysis, the one or more processors are configured to:

build a multivariate time series model for each group of assets, wherein the directed connectivity and the connectivity strength between each asset in the group of assets are determined by using the multivariate time series model; and generate a casual matrix for each group of assets based on the connectivity strength and the directed connectivity.

14. The system of claim 13, wherein the casual matrix is indicative of interconnections between each asset and the connectivity strength between each asset.

15. The system of claim 9, wherein to determine the root cause in the one or more root-cause assets, the one or more processors are configured to:

receive the plurality of validation parameters based on monitoring the plurality of assets, wherein the plurality of validation parameters include at least one of stiction data, over-tuned data, and external disturbances data;

validate the one or more root-cause assets based on the plurality of validation parameters; and determine the root cause in the one or more root-cause assets based on a result of the validation.

16. The system of claim 9, wherein the one or more processors are further configured to:

generate a report comprising the one or more root-cause assets and the root cause in the one or more root-cause assets.

17. A non-transitory computer-readable storage medium storing program instructions for performing a root-cause diagnosis of oscillations in a plurality of assets included in an industrial process, the instructions, when executed, perform the steps of:

receiving operational data from at least two or more assets among the plurality of assets, said operational data indicating one or more parameters associated with functioning of said assets;

processing the operational data from the at least two or more assets to perform a spectral analysis of the operational data to determine, for each asset of the plurality of assets, a set of dominant frequencies and a corresponding power, wherein the dominant frequencies indicate anomalous vibrations occurring in each asset and the corresponding power indicates a power associated with the anomalous vibrations;

forming a group of assets that shares a common dominant frequency among each asset in each group of assets;

determining a directed connectivity and a connectivity strength between each asset in each group of assets based on a causality analysis on each group of assets;

comparing the connectivity strength, between each asset in each group of assets, with a predefined threshold value; and determining, from the group of assets, one or more root-cause assets and a root cause in the one or more root-cause assets based on the connectivity strength more than the predefined threshold value and a plurality of validation parameters.

18. The non-transitory computer-readable storage medium of claim 17, wherein forming the group of assets that shares a common dominant frequency comprises:

comparing the corresponding power of each dominant frequencies of the set of dominant frequencies with a predefined maximum power;

selecting one or more assets from the plurality of assets based on the comparison that the corresponding power is greater than at least one-third of the predefined maximum power; and forming the group of assets from the one or more assets, wherein each asset comprised in each group of assets shares the common dominant frequency within a group.

19. The non-transitory computer-readable storage medium of claim 17, wherein determining the root cause in the one or more root-cause assets comprises:

receiving the plurality of validation parameters based on monitoring the plurality of assets, wherein the plurality of validation parameters include at least one of stiction data, over-tuned data, and external disturbances data;

validating the one or more root-cause assets based on the plurality of validation parameters; and determining the root cause in the one or more root-cause assets based on a result of the validation.

20. The non-transitory computer-readable storage medium of claim 17, further comprising:

generating a report comprising the one or more root-cause assets and the root cause in the one or more root-cause assets.

* * * * *